(12) United States Patent
Courter et al.

(10) Patent No.: US 9,672,573 B2
(45) Date of Patent: Jun. 6, 2017

(54) GRAPHICAL USER INTERFACE FOR FACILITATING ALLOCATION OF VARIABLE COMPENSATION

(71) Applicant: Perkins Coie LLP, Seattle, WA (US)

(72) Inventors: Craig Courter, Chicago, IL (US); Robert E. Giles, Woodinville, WA (US); Kumar Gaurav, Kirkland, WA (US); Rick Johnson, Sammamish, WA (US)

(73) Assignee: Perkins Coie LLP, Seattle, WA (US)

( * ) Notice: Subject to any disclaimer, the term of this patent is extended or adjusted under 35 U.S.C. 154(b) by 112 days.

(21) Appl. No.: 14/212,674

(22) Filed: Mar. 14, 2014

(65) Prior Publication Data

US 2014/0279315 A1 Sep. 18, 2014

Related U.S. Application Data

(60) Provisional application No. 61/792,417, filed on Mar. 15, 2013.

(51) Int. Cl.
| | |
|---|---|
| *G07B 17/00* | (2006.01) |
| *G07F 19/00* | (2006.01) |
| *G06Q 40/00* | (2012.01) |
| *G06Q 10/06* | (2012.01) |

(52) U.S. Cl.
CPC ..... *G06Q 40/125* (2013.12); *G06Q 10/06398* (2013.01)

(58) Field of Classification Search
None
See application file for complete search history.

(56) References Cited

U.S. PATENT DOCUMENTS

| | | | | |
|---|---|---|---|---|
| 2002/0133458 | A1* | 9/2002 | Zhou et al. | 705/39 |
| 2002/0169678 | A1* | 11/2002 | Chao et al. | 705/26 |
| 2002/0188535 | A1* | 12/2002 | Chao et al. | 705/35 |
| 2005/0108268 | A1* | 5/2005 | Saintry et al. | 707/102 |
| 2006/0010060 | A1* | 1/2006 | Jones et al. | 705/35 |
| 2006/0233121 | A1* | 10/2006 | Cooper | 370/261 |
| 2006/0233348 | A1* | 10/2006 | Cooper | 379/265.06 |
| 2009/0099975 | A1* | 4/2009 | Torre et al. | 705/36 R |

\* cited by examiner

*Primary Examiner* — Fateh M Obaid
(74) *Attorney, Agent, or Firm* — Perkins Coie LLP

(57) ABSTRACT

Described above is a system for allocating variable compensation to a group of individuals. The system displays objective financial statistics associated with individuals, and subjective factors to be set by a user, where the system can convert subjective factors set by the user into a value. The user can then select base and variable compensation values for each individual. Other details are described herein.

20 Claims, 15 Drawing Sheets

GRAPHICAL USER INTERFACE FOR FACILITATING ALLOCATION OF VARIABLE COMPENSATION

CROSS-REFERENCE TO RELATED APPLICATIONS

This application claims the benefit of U.S. Provisional Application No. 61/792,417, filed Mar. 15, 2013, and incorporated by reference herein.

BACKGROUND

Variable compensation schemes, such as year-end bonuses, are popular in many industries as a mechanism for rewarding members of an organization for good individual performance or particular contributions toward good overall corporate performance. These compensation schemes are particularly common in professional services industries, such as law or accounting. Often, variable compensation is determined by allocating a predetermined pool of money to a group of employees. Because compensation is limited by the available pool of money, the compensation process must account for relative performance differences between different employees, as well as absolute performance metrics. Further, the process should consider not only objective, but also subjective, contributions by each employee. Thus, the compensation process should be designed to ensure fairness in distributing the available compensation pool.

In addition, organizations often use a committee of high-level employees or officers to determine variable compensation. The compensation process must, therefore, consolidate input from multiple committee members to determine the correct variable compensation. These committees generally use paper documentation or standard office spreadsheet and word processing tools for their work. In the absence of a standard process, committee members tend to create their own ad hoc systems for handling relevant data and tracking compensation recommendations.

Overall, the need exists for a system that overcomes the above problems, as well as one that provides additional benefits. In general, the examples herein of prior or related systems and their associated limitations are intended to be illustrative and not exclusive. Other limitations of existing or prior systems will become apparent to those of skill in the art upon reading the following Detailed Description

BRIEF DESCRIPTION OF THE DRAWINGS

FIGS. 3A-3I illustrate a user interface for interacting with the compensation system.

DETAILED DESCRIPTION

Overview

Figure 1:
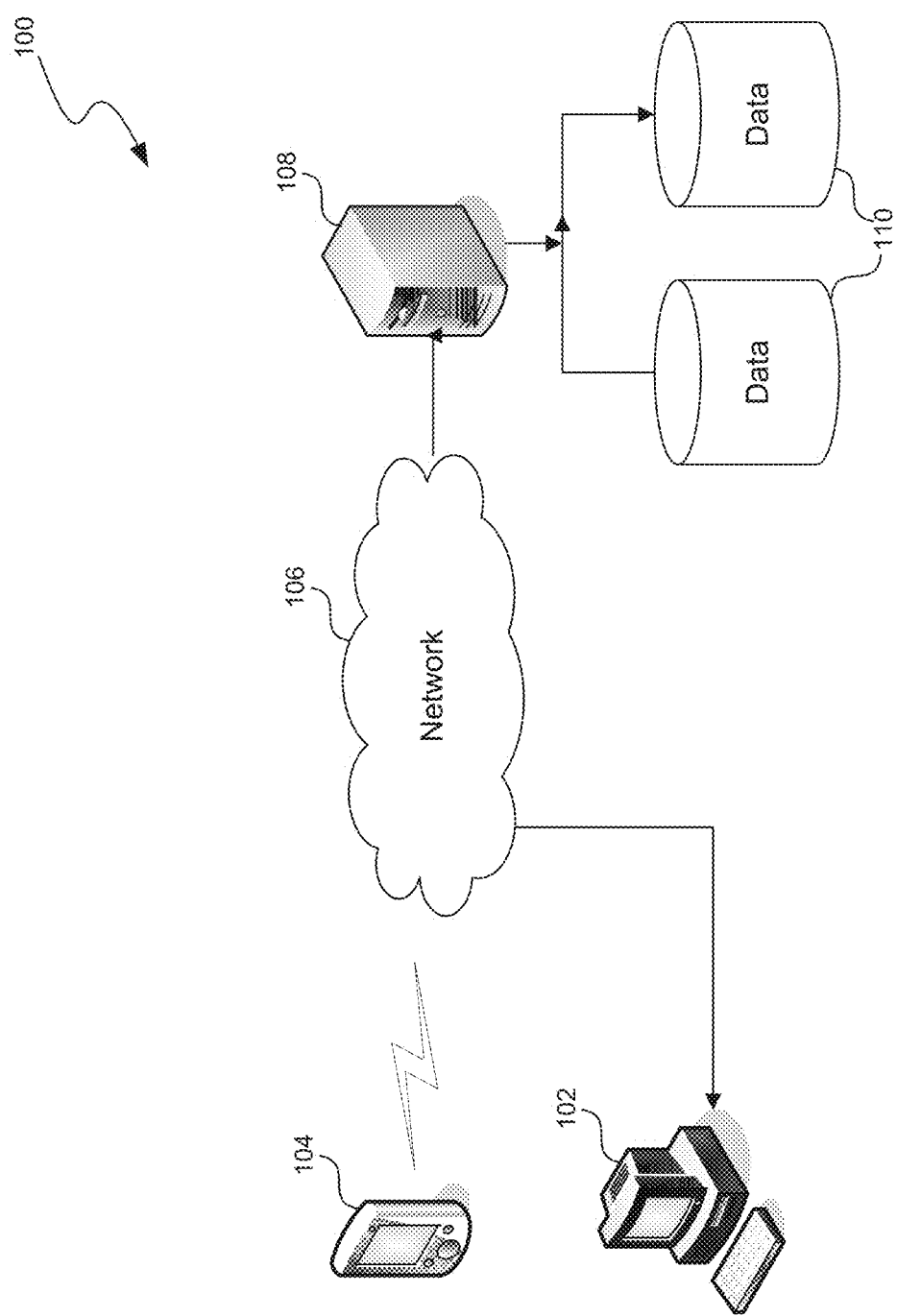
FIG. 1 is a block diagram of an environment in which a compensation system operates.

A method and system for allocating variable compensation based on subjective and objective factors is disclosed (the "compensation system" or the "system"). The system provides a user interface that simplifies the process of allocating variable compensation to individuals in an organization. During operation, the system initially displays a set of financial statistics corresponding to objective measures of a selected individual's performance. The objective measures correspond to measurable factors relating to the financial performance of the organization, such as billings generated by an attorney or a consultant. The financial statistics may also characterize income that is indirectly attributable to the member of the organization; for example, the financial statistics may show amounts billed to or money collected from clients originated by the selected individual. In some cases, the system may enable the user to adjust the financial statistics to accurately reflect the user's understanding of the individual's actual performance.

The system further provides a user interface that enables the user to assign values to one or more subjective factors relating to the selected individual's performance. The subjective factors may be any factor that is important to the organization's core values, such as the individual's contribution to mentoring, contribution to diversity in the organization, or potential to hold future leadership positions within the organization. In some implementations, the user interface provides a slider or other interface element allowing the user to adjust the value for that particular factor within a predetermined or specified range, though an indefinite range is also possible. After the user has selected a value for a subjective factor, the system converts the selected value into a numerical or monetary amount within a predetermined range for that factor (where that range or value may be nonlinear along the range). The system may then display current values for the subjective factors and can dynamically adjust the value for a factor as the user adjusts the user interface element. The user can then recommend compensation for the selected individual based on a combination of the objective factors and the numerical or monetary value of the subjective factors.

In some implementations, the system provides a mechanism for integrating, synthesizing or aggregating compensation recommendations from multiple users to determine a final compensation amount. The system may integrate with a database or other server on a network that is configured to store the financial statistics and compensation recommendations from users. After multiple users have entered their recommendations for the compensation level for an individual, the user interface may display a screen that shows the compensation recommended by each user. The users may then review the recommendations from individual users to vote or reach a consensus on a final compensation level for each individual.

While a pre-determined pool of money and how compensation is limited by the available pool of money is generally discussed herein, the system need not be so limited and may compare relative performance and relative compensation even if not operating strictly within a budget. For example, the system may be used for associates, counsel, patent agents and paralegals in a law firm, which need not allocate a finite or pre-determined amount of compensation for such employees. Thus, the system may allocate a pool of money (whether pre-determined, a range, or an indefinite amount)

to a group of employees, but in all such cases, the compensation process accounts for relative performance differences.

Suitable Platform

FIG. 1 is a block diagram of an environment 100 in which the compensation system operates. The environment 100 includes one or more client devices that may implement a user interface for the compensation system. In particular, the environment 100 includes a computer 102 and a mobile device 104, which may implement the user interface discussed below using a local application or by accessing web pages configured to provide the elements of the interface. During operation, a user interacts with the user interface on the computer 102 or the mobile device 104 to provide input to the compensation system. The user interface may store the input locally or transmit it for input to a central server 108 via a network 106. The network 106 may be a Local Area Network (LAN) using, for example, Ethernet or IEEE 802.11 wireless LAN technology, or a Wide Area Network, such as the Internet. The central server 108 is connected to a storage component 110, which is configured to store financial information to support the user interfaces on the computer 102 or the mobile device 104. The storage component 110 may be implemented as flat storage or may use database software, such as Microsoft SQL Server, provided by Microsoft Corporation of Redmond, Wash.

Figure 2:
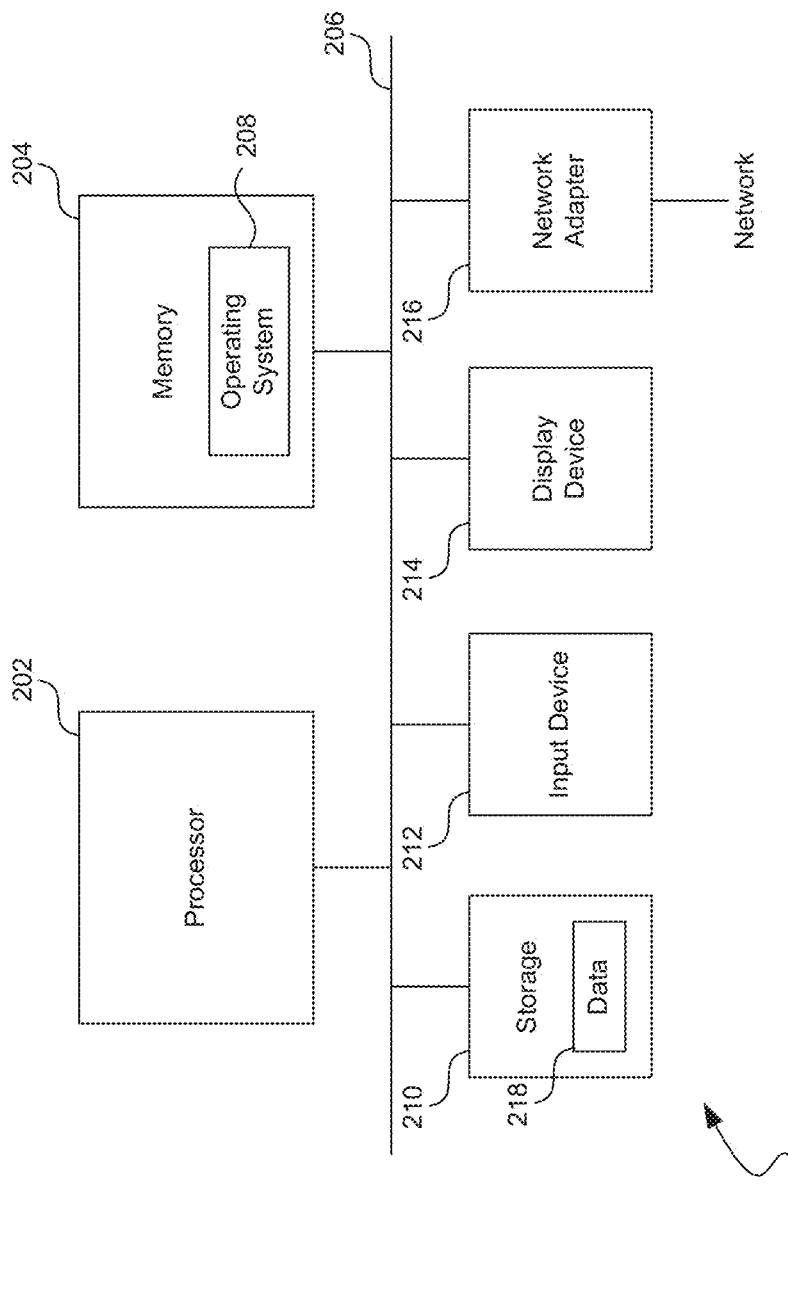
FIG. 2 is a high-level block diagram showing an example of the architecture of a device.

FIG. 2 is a high-level block diagram showing an example of the architecture of a device 200. The device 200 may represent the computer 102 of FIG. 1. The device 200 comprises one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206, therefore, may comprise, for example, a system bus, a Peripheral Component Interconnect (PCI) family bus, PCIe, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire," Thunderbolt, etc.

The processor(s) 202 may comprise central processing units (CPUs) of the device 200 and, thus, control the overall operation of the device 200. In certain examples, the processor(s) 202 accomplish this by executing software or firmware stored in memory 204. The processor(s) 202 may be, or may comprise, one or more programmable general purpose or special purpose microprocessors, digital signal processors (DSPs), programmable controllers, application-specific integrated circuits (ASICs), programmable logic devices (PLDs), or the like, or a combination of such devices.

The memory 204 is, or comprises, the main memory of the device 200. The memory 204 represents any form of fixed or removable random access memory (RAM), read-only memory (ROM), flash memory, or the like, or a combination of such devices. In use, the memory 204 stores, among other things, an operating system 208 of the device 200.

The device 200 comprises an input device 212, which enables a user to control the device. The input device 212 may comprise a keyboard, trackpad, touch sensitive screen, or other standard computer input device. The device 200 also comprises a display device 214 suitable for displaying a user interface. The device 200 further comprises a network adapter 216 that provides the device 200 with the ability to communicate with remote devices over a network and may be, for example, a wireless adapter. The device 200 may further comprise local storage 210 coupled to the interconnect 206. The local storage 210 may comprise, for example, a flash memory device configured to provide mass storage and stores data 218 used by the mobile device. As described more fully herein, the device may store sufficient data in the local storage to enable usage when not connected to the network, synchronize off-line data when reconnected the network, and wipe data when no longer needed to maintain confidentiality.

Suitable User Interface

FIGS. 3A-3I illustrate an example of a user interface for interacting with the compensation system. The user interface may be displayed under the control of the computer system described in FIG. 2. The user interface provides a tool or viewer for a user to allocate available compensation in a variable compensation system. A variable compensation systems described as an example below includes at least two components. The first is the base salary, which is the fixed portion of an individual's compensation that is guaranteed to the individual for a particular period, such as a calendar year. The base salary is typically determined at the beginning of the period and is generally forward-looking—that is, it is intended to compensate the individual based on projected performance in the future. The second component of variable compensation is the bonus, which is generally backward-looking. That is, the bonus is typically determined based on the individual's recent performance, such as during a particular accounting period (e.g., the previous or current year). The user interface of FIGS. 3A-3I allows the group determining compensation (e.g., a compensation committee) to determine both of these components. However, the interface can be used to determine only the bonus portion. This may be useful in compensation systems that use a bonus, but use a predetermined formula for determining base salary, such as calculating base salary based on the individual's years of seniority.

Figure 3A:
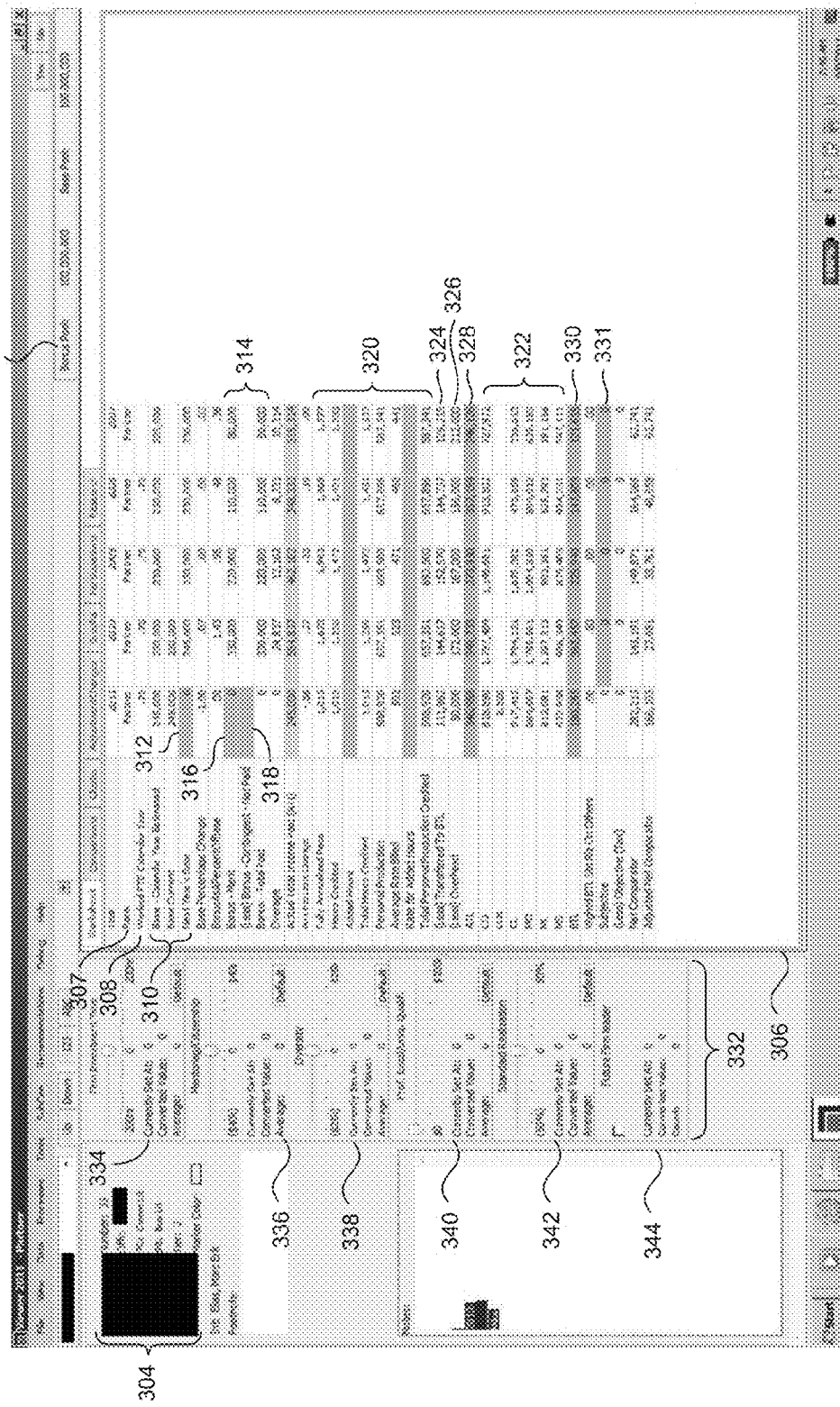

FIG. 3A illustrates an individual statistics screen, which shows basic financial statistics for evaluating a selected individual (e.g., a partner in a law firm). The individual statistics screen includes a summary area 302 that indicates the available pools of money for base pay and bonuses. As discussed below, the user uses the user interface to allocate the bonus pool and the base pool to all of the members of a particular group (in this case, all partners) based on both objective and subjective criteria. The available pool may be set at the beginning of the compensation process by an administrator or chief financial officer who is knowledgeable about the organization's overall financial situation.

The individual statistics screen also includes an information section 304 that provides basic information about the individual under consideration. In particular, the information block 304 displays the individual's employee ID number, the geographic location of the individual (e.g. office) and photo of the individual (both obscured in FIG. 3A), and an organizational group and subgroup that the individual belongs to (e.g. commercial litigation practice group and business litigation subgroup). A "Marker Color" field provides a drop-down selection that allows the user to highlight the individual with a particular color, which can be shown as a highlighted row of that color in other screens (such as in the Comparisons screen described below). The information section 304 also includes an indicator of the member's "tier." Typically, the individual's base compensation or overall compensation is limited based on a range of compensation defined by the individual's tier. In some implementations, an organization has multiple tiers (e.g. four or more tiers), each of which corresponds to a specific base compensation range. The compensation ranges may be selected so they are discrete (i.e., non-overlapping), and could include gap ranges separated by some amount of money. This allows the organization to clearly delineate its members and to allow for promotion between tiers based on certain rules, e.g. exceeding firm averages for certain statistics. The device may provide a method to identify the individual's tier, provide assistance to a user to determine whether an individual should be promoted to a higher tier, and may provide a method to warn the user if the tier's rules are violated for current inputs.

Shown underneath section 304 are some additional fields, such as identification of an interviewer who may have interviewed the displayed individual, a "Footnote" section that can provide some additional comments regarding the individual, and a "Notes" section that allows a user to input notes regarding the individual being considered. For example, the Footnote section can include read-only notes for an individual uploaded by a finance team/department. While not shown, the system may provide a section "Last Yr. Notes" that allows a compensation committee chair or sub-chair to provide notes for all users to view, which may reflect the committee's comments from a prior year regarding that individual. It is possible for these Footnotes and Notes to also be carried forward from prior compensation years, which can, for example, then provide the user with some context as to the individual's past compensation (as well as, prior slider settings, prior compensation adjustments, and other changes the user may have made in prior years).

While not shown, the system may display additional data in response to certain user actions, such as a right-click, mouseover or pointer hover over a particular value or statistics displayed. For example, right-clicking or hovering the pointer over and individuals base salary can cause a pop-up window to display statistics for the firm overall, such as the highest and lowest bases, median base, average base, etc. Of course, additional data associated with other displayed values or statistics may be provided.

The individual statistics screen also includes a worksheet area 306 that displays financial statistics for current and prior years. The worksheet area 306 includes boxes that accept user input, which may be highlighted in blue. For each year, the worksheet section 306 displays the individual's rank in the organization 307 (e.g., partner, associate, etc.) and the percentage of full time 308 that the individual worked during the calendar year. The worksheet area 306 also includes rows 310 that display the individual's base salary. The rows 310 particularly include an input block 312, which allows a user to input a value for the individual's base salary for the upcoming year. Although allowing direct input in the blocks in the worksheet area 306 is particularly convenient for the user, other interface methods may be used to input the upcoming year's base salary, such as a dialogue box, or wizard.

The worksheet section 306 includes rows 314, which show bonuses paid to the individual during the years displayed. Methods of determining the bonus are discussed in greater detail below. The initial bonus (labeled "Bonus—Merit") specifies the merit bonus allocated to the individual for a particular year, while the following row (labeled "(Less) Bonus—Contingent—Not Paid") enables the user to enter a portion of the bonus that should be temporarily or permanently withheld because it is based on money that has not yet been received by the organization. The final row (labeled "Bonus—Total Paid") shows the net bonus paid, which is the difference between the bonus and the contingent portion of the bonus that was not paid. The rows 314 also include input blocks 316 and 318 that can be used to enter values for the individual's merit bonus and contingent reduction for the current year. As with the input block 312, the input blocks 316 and 318 allow the user to input the compensation information directly; however, the user interface may also provide for other input methods, as discussed above.

The worksheet section 306 also includes rows 320, which display financial statistics characterizing the individual's direct contribution to the organization's income, which are referred to as Above the Line (ATL) statistics. For a law firm, the statistics in rows 320 characterize income received by billings for the individual's own time during the year (or other accounting period). In particular, the rows 320 include rows (labeled "Fully Annualized Pace" and "Hours Credited") indicating the actual number of hours billed by the selected individual. The Hours Credited row indicates the number of hours actually billed by the individual, while Fully Annualized Pace indicates the prorated number of hours that would have been billed by an equivalent full time employee. As shown in row 308, the selected individual is currently considered to be 0.75 of a full time employee. Accordingly, hours credited are annualized by adding an additional one third of the individual's actual billed time.

The rows 320 also include an input row labeled "Added Hours," which the user may use to credit additional hours for work performed that was not captured under standard metrics, such as for administrative hours. This field provides additional flexibility to adjust the individual's hours where the individual performed work that was not captured in the initial statistics, including maternity/parental leave, sabbaticals, etc. The rows 320 also include a row labeled "Personal Production" indicating the total monetary value of the individual's billing during each year.

Based on this information, the system automatically determines a personal production value (determined by multiplying average rate billed by total hours credited). (The average rate billed can be determined using various means that may take into account different rates, various discounts, etc.) This value is displayed in the row labeled "Average Rate Billed." The user may specify a billing rate for added hours that are different from the individual's standard billing rate by entering the rate in the row labeled "Rate for Added Hours." Finally, the rows 320 include a row labeled "Total Personal Production Credited," which displays the total value credited to the individual based on hours billed and any added hours.

The interface also displays financial statistics for the individual's indirect contributions to revenue, which are referred to as Below The Line (BTL) statistics, in rows 322. BTL statistics measure revenue generated by clients or matters that are originated or managed by the selected individual. For example, the row labeled "CO" (for "client origination") indicates revenue billed to clients that the selected individual brought to the organization. The row labeled "LCR" (for "legacy client retention", or just "client retention" (CR)) indicates special BTL credit associated with work for specific long-term clients of the organization where no partner currently has CO credit. The row labeled "CL" (for "client lead") indicates revenue for work billed for clients in which the selected individual is the lead in managing the client relationship. This differs from CO revenue in that origination refers to the individual who brought the client to the organization, while lead refers to the individual who manages the relationship in the current year.

The BTL statistics also include statistics relating to revenue for individual matters. In this context, a "matter" is an individual project handled for a particular client. Any one client may have a handful or hundreds of different matters. In a law firm, a matter may be a patent application, a business deal, a lawsuit, or any other division of work.

The rows 322 include a row labeled "MO" (for "matter origination"), which indicates revenue for matters originated by the selected individual. Similarly, the row labeled "ML" (for "matter lead") indicates revenue for matters for which the selected individual was the lead, i.e., matters in which the selected individual had primary performance responsibility. The row labeled "MS" (for "matter supervision") indicates revenue for matters supervised by the selected individual, i.e., matters for which the individual was responsible for the day-to-day management.

The worksheet area 306 also includes rows summarizing the statistics discussed above. In particular, row 324 indicates a portion (as determined by the user) of the individual's production value to be subtracted from the individual's direct contributions so it is available for the user to allocate to the individuals making the indirect contributions reflected in the BTL financial statistics. This allows the user to consistently credit part of each individual's personal production to the individuals who originated, managed or otherwise indirectly contributed to the personal production. Row 326 indicates the individual's personal share of overhead for the organization. Row 328 displays the individual's total ATL contribution by subtracting the overhead and the amount transferred to BTL from the total personal production credited. Similarly, row 330 indicates the total below-the-line contribution by summing the individual values listed in rows 322, after applying a weighting, such as a global weighting applied by the user to each of the statistics in rows 322 for all individuals under consideration.

Other statistics may be provided, such as a weighted below the line standard realization on other people's time, which can represent the net billings on other people's time divided by their cost, which may then be normalized by a firm average and appropriately weighted (to provide, e.g. a standard realization). An Objective statistic may be a user-supplied discount or tax applied to certain individuals. A Net Comparator row can be of value summarizing values above to help in comparisons and to find anomalies. For example, the Net Comparator value may represent the above the line (ATL), below the line (BTL), and subjective values minus total compensation, objective values, etc. The Adjusted Net Comparator value may be similar to the Net Comparator value, but can be adjusted based on an allocation of a bonus pool applied to individuals (e.g. shifted to average to zero across all partners).

The individual statistics screen also includes a subjective factors area 332, which allows the user to account for subjective aspects of the individual's performance. The subjective factors area 332 enables the organization to reward individuals for their contributions to non-financial aspects of the organization's operation. The subjective factors area 332 includes user interface elements that enable the user to quantify the individual's performance for various subjective factors.

In particular, the subjective factors area 332 includes a user interface element 334 that enables the user to assign a value to time invested in managing the organization's operations. This element allows the user to account for the selected individual's contribution to improving the organization's internal operations, such as improving processes, assisting in bringing in new business, etc. This element also allows the user to account for time spent in management roles within the organization. For example, the user may allocate hours for element 334 to an individual who managed a subgroup in the organization during the previous year.

The subjective factors area 332 also includes a user interface element 336 for allocating a value to the individual's contribution to mentoring or overall citizenship within the organization. The user may use the element 336 to assign a value to the individual's contribution to mentoring junior members of the organization or to other aspects of good citizenship in the organization, such as membership in committees for managing charitable activities. Similarly, a user interface element 338 allows the user to quantify the selected individual's contribution to increasing diversity within the organization. This factor may be used to account for, for example, the individual's activities with regard to recruiting or improving the retention of diverse employees.

The subjective factors area 332 also includes user interface elements for quantifying subjective aspects of the individual's work performance. For example, user interface element 340 enables the user to quantify an individual's professional excellence or unique qualifications. In a law firm, this user interface element 340 could be used to provide extra credit to a particularly well-known litigator whose presence significantly increases the reputation of the firm. Similarly, a check box element 344 allows the user to indicate that the selected individual is considered a "future firm leader." This element may be used to provide extra incentive and encouragement to individuals who are considered likely to take leadership roles within the organization in the future. Finally, the area 332 includes a standard realization user interface element 342, which enables the user to adjust for the relative profitability of the work represented by the statistical credits in the worksheet area 306. In general, the standard realization factor allows the user to increase or decrease the allocation of credits to an individual based on the profitability of the work represented by the BTL statistics.

As shown in the figure, each of the subjective factors is associated with a range of numerical values, which may be measured as a monetary value or as a number of billable hours assigned to the subjective factor. For example, the firm investment time element 334 is assigned a range of −200 hours to +200 hours. Similarly, the mentoring/citizenship element 336 is assigned a range of −$40,000 to +$40,000. During operation, the user assigns a position to some or all of the subjective factors. The system then converts the assigned position to a value proportional to its relative location in the assigned range for that factor. For example, if the user placed the slider for diversity at the 75% position in the range, the corresponding numerical value would be $12,500, which is 75% from the low value of the range to the high value of the range. Although specific ranges are discussed above and in the figure, one skilled in the art will appreciate that the ranges may be modified depending on the relative priority the organization assigns to each of the subjective factors. In calculating the total, the system converts factors measured in hours (e.g., investment) to a monetary value using a standard billing rate. The system then adds monetary values for all factors to generate the total value of all subjective factors. The total monetary value for all subjective factors is displayed in row 331.

Typically, during operation the user will first enter values for all relevant subjective factors. The user can then determine values for the individual's current year bonus and base salary for the upcoming year based on the financial statistics displayed in the worksheet section 306. The user inputs the values for base salary and bonus by typing them directly into the input blocks 314 and 316, respectively.

Figure 3B:
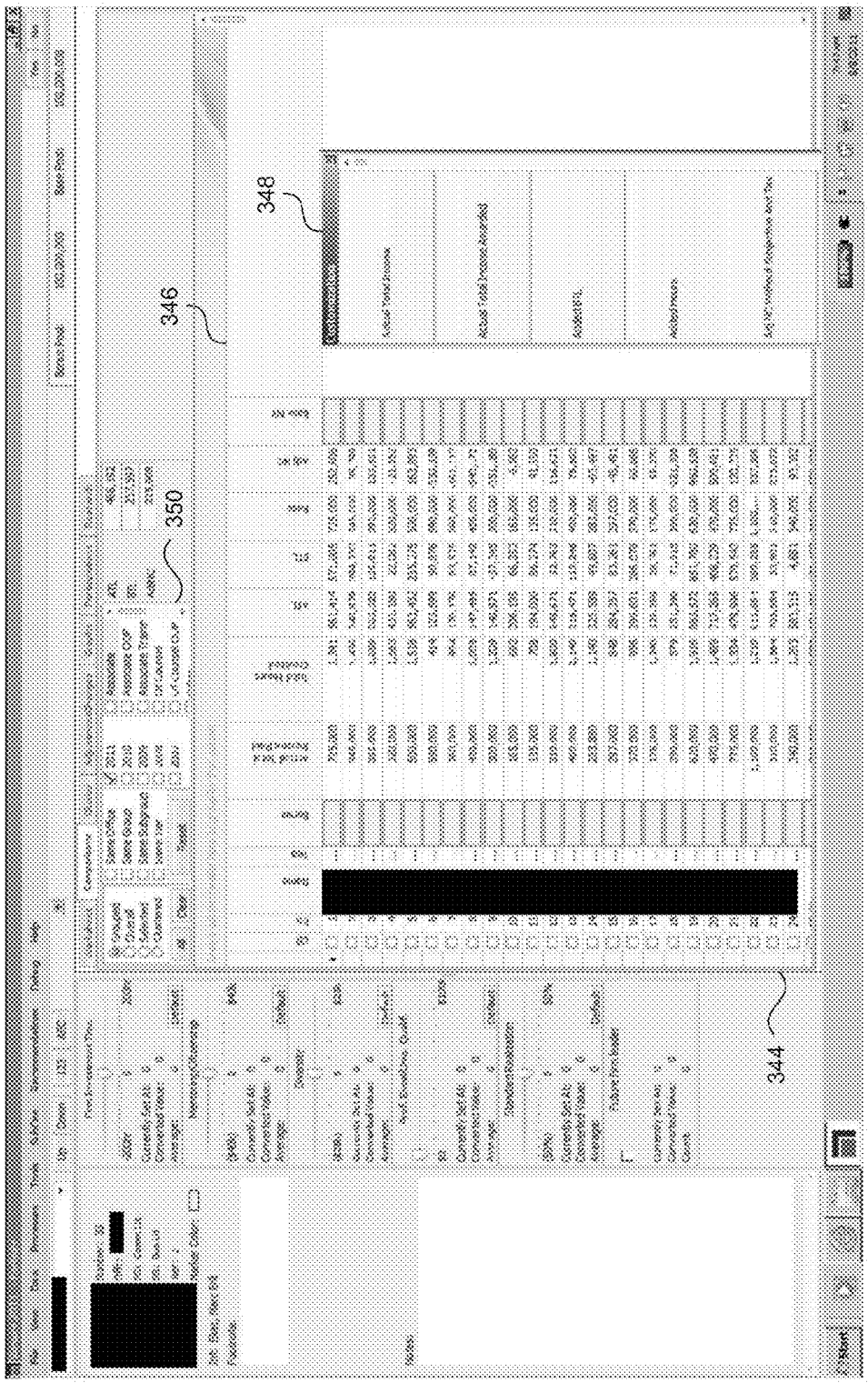

FIG. 3B illustrates a comparison screen of the representative user interface. The comparison screen includes a comparison area 344 that allows the user to compare financial statistics for multiple members of the organization. The comparison screen includes a list area 346 that displays a list of financial and compensation information for a selected group of individuals. As shown in FIG. 3B, the list area 346 includes columns for information for each individual, such as name (obscured in FIG. 3B), year, bonus, total income, total hours, etc. The user may be able to double-click on the name or row for each displayed individual, which can then open up or navigate to that individual's statistics screen (e.g. FIG. 3A). The user interface also includes a customization window 348 that enables a user to add or remove columns from the list area 346. In some implementations, the user may add a column by selecting the desired statistic in the customization area 348 and dragging it to the list area 346. Similarly, in some implementations, the user may reorder columns by clicking and dragging the desired column to a different location in the list area 346.

The comparisons screen also includes a search criteria element 350 that allows the user to restrict the individuals that are displayed in the list area 346. In particular, the element 350 allows the user to restrict the list to individuals in the same office, group, subgroup, salary tier, year, or class of employee (e.g., paralegal, associate, patent agent, partner, etc.) as the selected individual. A particular advantage of the comparisons view is that it enables the user to easily compare statistics for the selected individual to other individuals who are similarly situated. Because the compensation structure requires distributing a money to a set of individuals, the comparisons view provides a simple tool for ensuring that allocations to each individual are fair, especially where the compensation structure requires distributing a finite amount of money to a set of individuals.

Figure 3C:
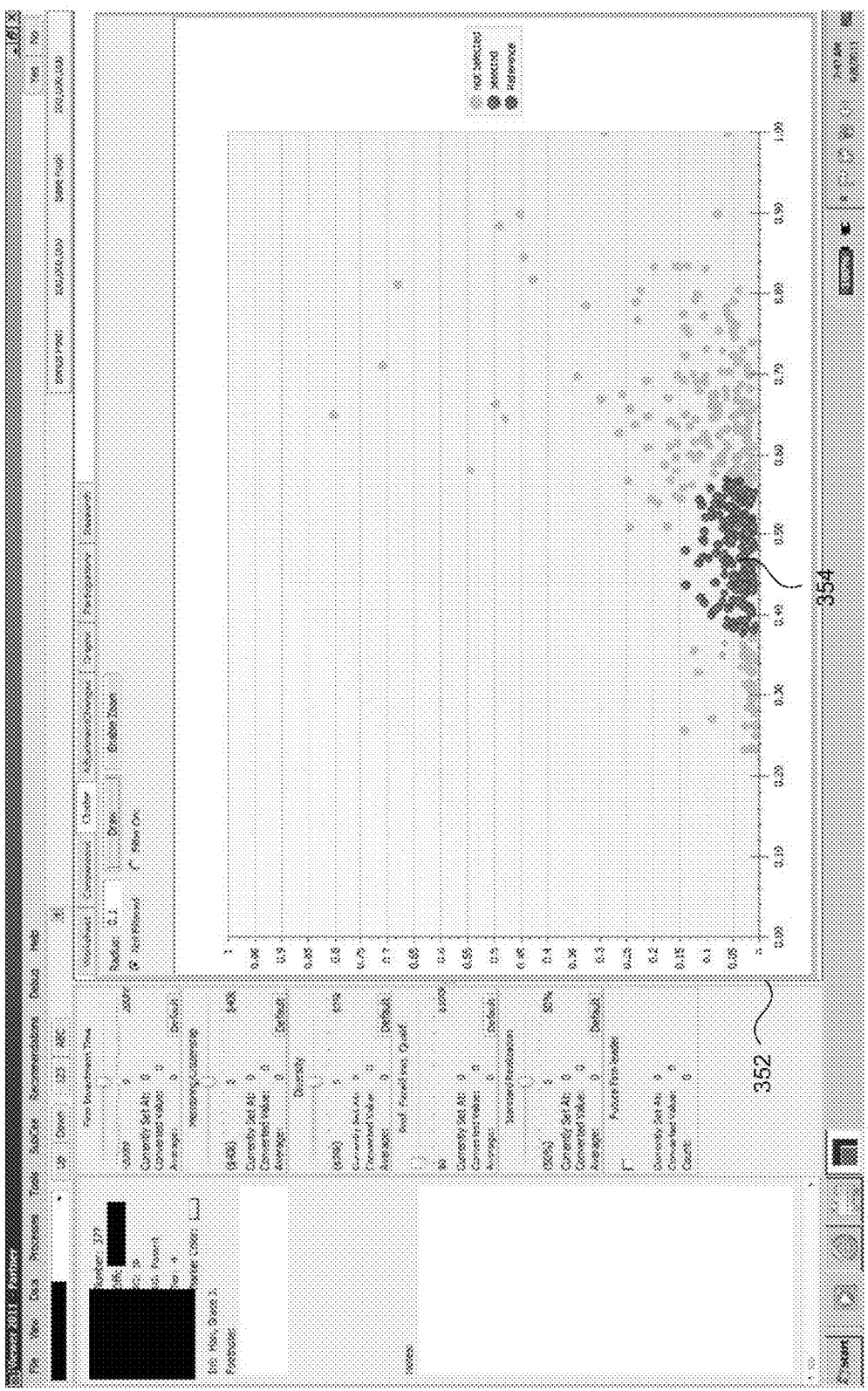

FIG. 3C displays a graphical comparison screen, which displays a graph for comparing the selected individual to other members of the organization. The graphical comparison screen includes a cluster graph 352. The X axis of the cluster graph 352 corresponds to ATL statistics for each individual, while the Y axis of the cluster graph corresponds to BTL statistics. To simplify comparison, the statistics are normalized based on the minimum and maximum values for each axis across the entire organization. As shown in FIG. 3C, the selected individual is placed on the graph at point 354, which falls within a large cluster of similarly situated members of the organization.

In some implementations, the cluster graph 352 provides features to enable the user to easily access related information. For example, the system may provide a mouseover behavior in which the financial statistics for a particular individual are displayed in a popup window when the user moves the cursor over that individual's point or icon on the graph. In some implementations, the user can customize the graph to display only individuals within a particular radius of interest, such as individuals within one tenth of a point of the selected individual. The cluster graph 352 may also allow the user to zoom in on particular parts of the graph. For example, the cluster graph 352 may allow the user to use a mouse or other pointing device to select a rectangular area of the display and zoom the graph in or out to display the selected area. In some implementations, the system displays detailed financial statistics in response to the user selecting (e.g., double-clicking) a point on the cluster graph 352, such as by opening up the individual's statistics screen (like FIG. 3A).

Figure 3D:
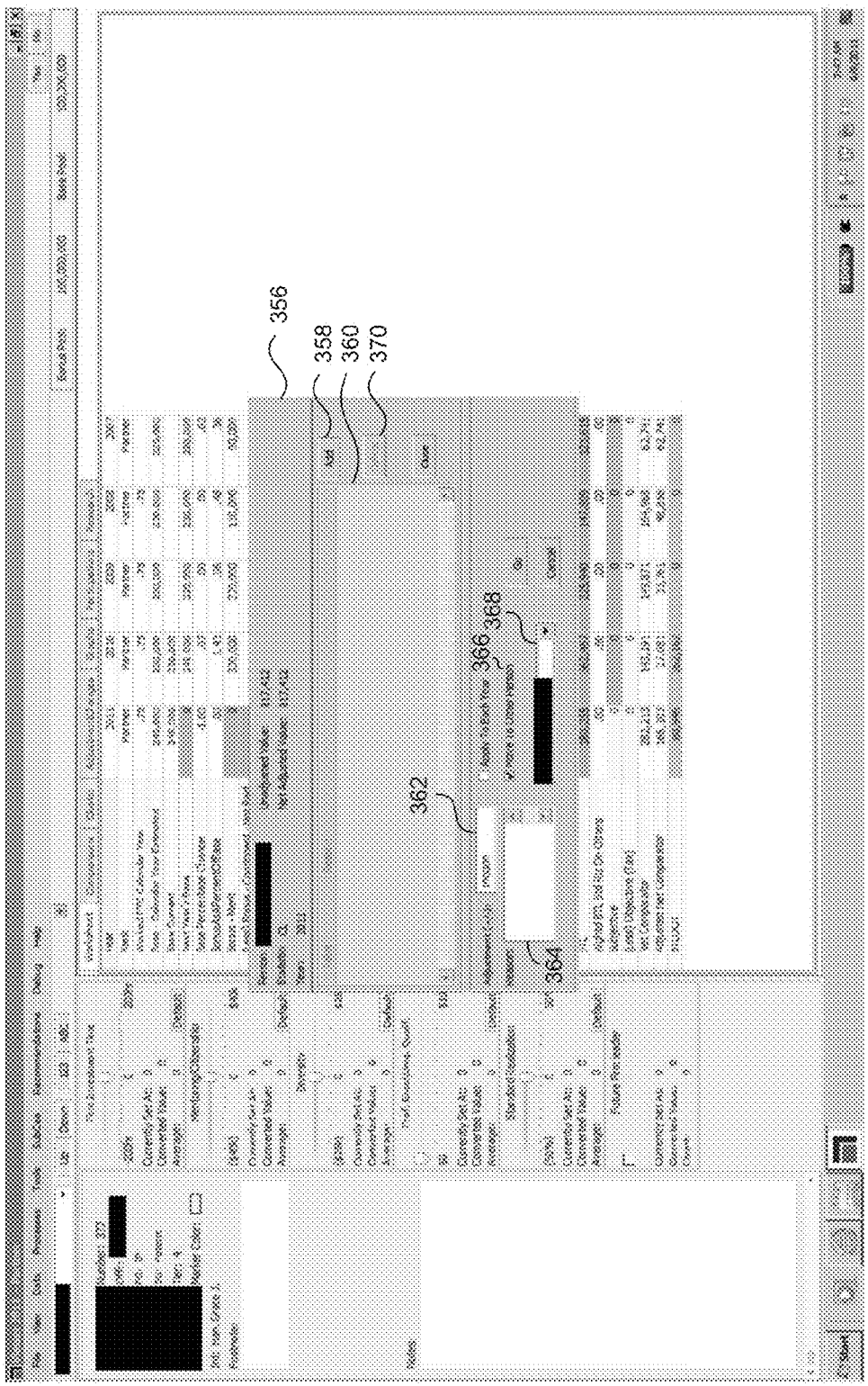

FIG. 3D illustrates an adjustment dialog 356 that allows the user to adjust financial statistics within the worksheet area 306. During operation, the user may select a particular value in the BTL statistics to adjust by, for example, double clicking in the box or by right clicking on the desired box and selecting a command from a popup menu. In response to the command, the system displays the adjustment dialog 356, which allows the user to enter one or more adjustments to the selected statistic. As shown in FIG. 3D, the user has selected to adjust the value of the client lead (CL) statistic for the year 2011.

The adjustment dialog 356 includes an adjustment list 360 that displays a list of adjustments to the selected statistic and reasons for each adjustment. To add an adjustment, the user enters an adjustment value in text box 362 and a reason in text box 364 and presses an add button 358. The dialog 356 also includes a check box 366 that enables the user to move the adjusted value to a different person. This may be used, for example, if the user believes that lead responsibility is more properly assigned to a different individual than shown in the original statistics. A drop-down list 368 lists other members of the organization so that the user can select the appropriate person to receive the value of the adjustment. The dialog 356 also includes a delete button 370, which enables the user to delete a particular adjustment to the selected statistic.

Figure 3E:
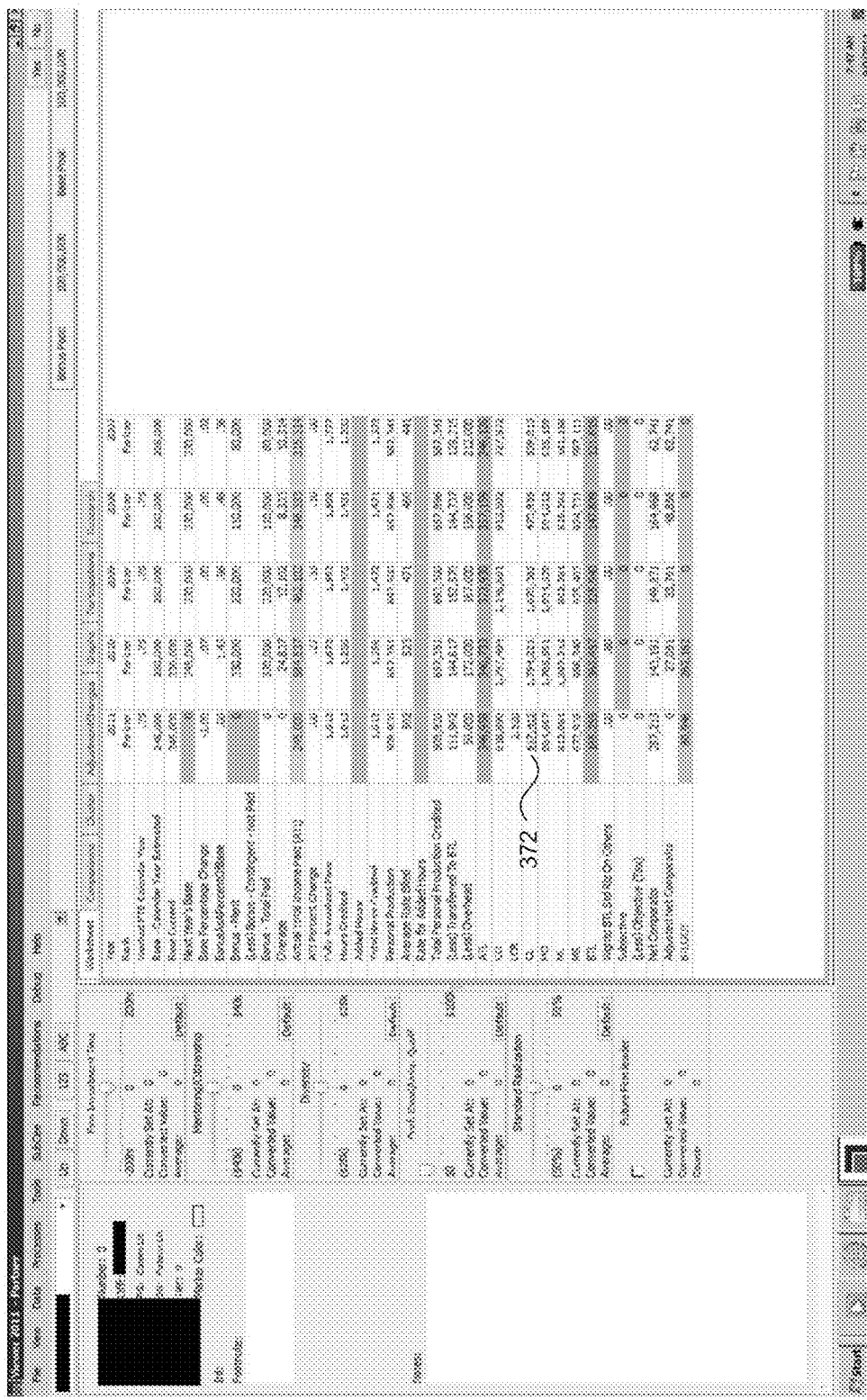

FIG. 3E illustrates the individual statistics screen after an adjustment has been applied to a BTL statistic. In particular, the value in box 372 has been adjusted to increase its value by $100,000. The adjusted value is underlined to indicate that the adjustment was applied. If a user later wishes to view adjustments for an individual, the underlining provides an indication that there is information stored for this particular statistic.

Figure 3F:
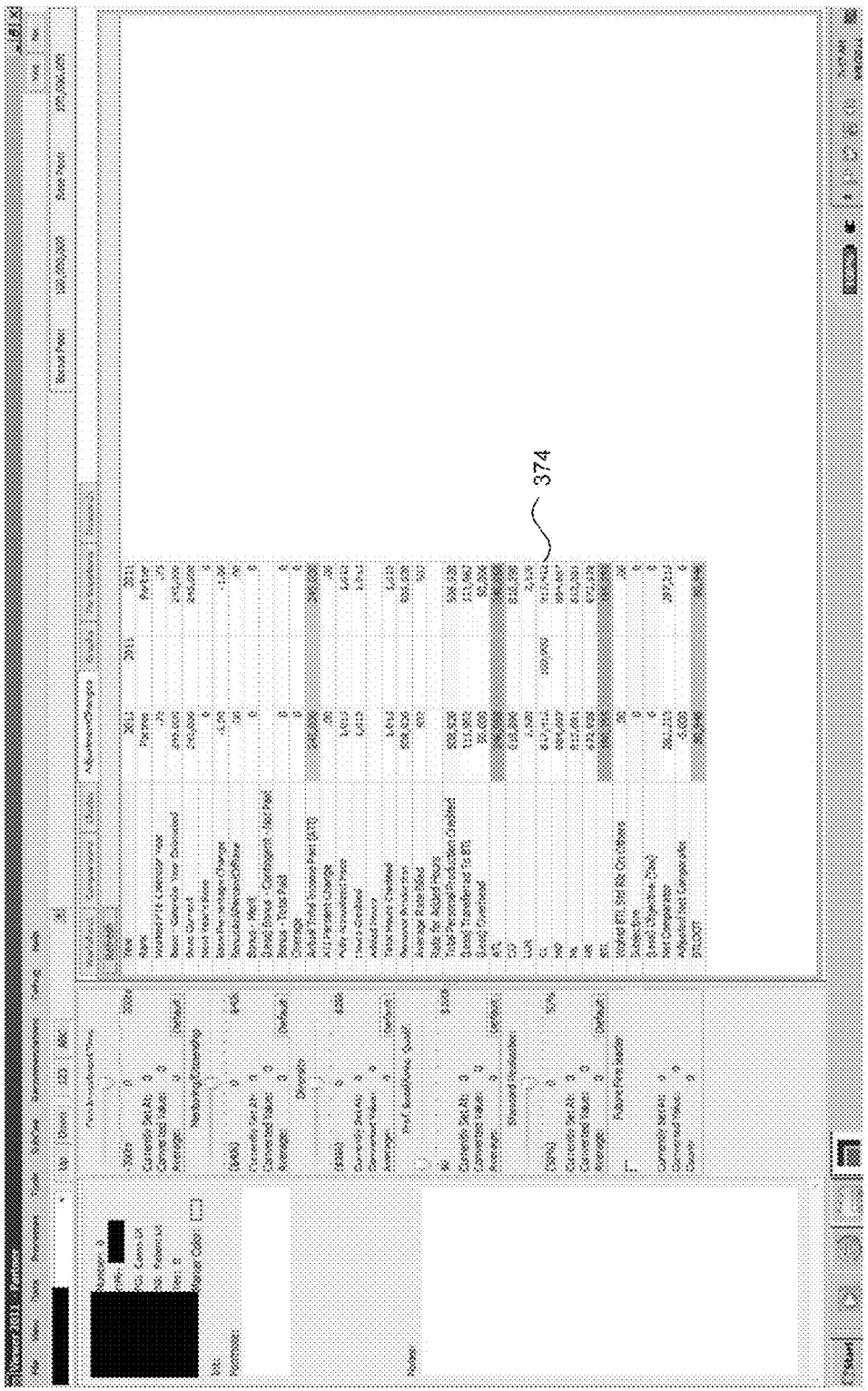

FIG. 3F illustrates an adjustments summary screen, which summarizes adjustments made to particular elements in the worksheet area. Row 374 of the user interface shows that the client lead value for the selected individual has been adjusted by $100,000 from $817,412 to $917,412. If the user had made adjustments to other statistics, these adjustments would also be listed in the corresponding rows of the adjustments summary screen.

Figure 3G:
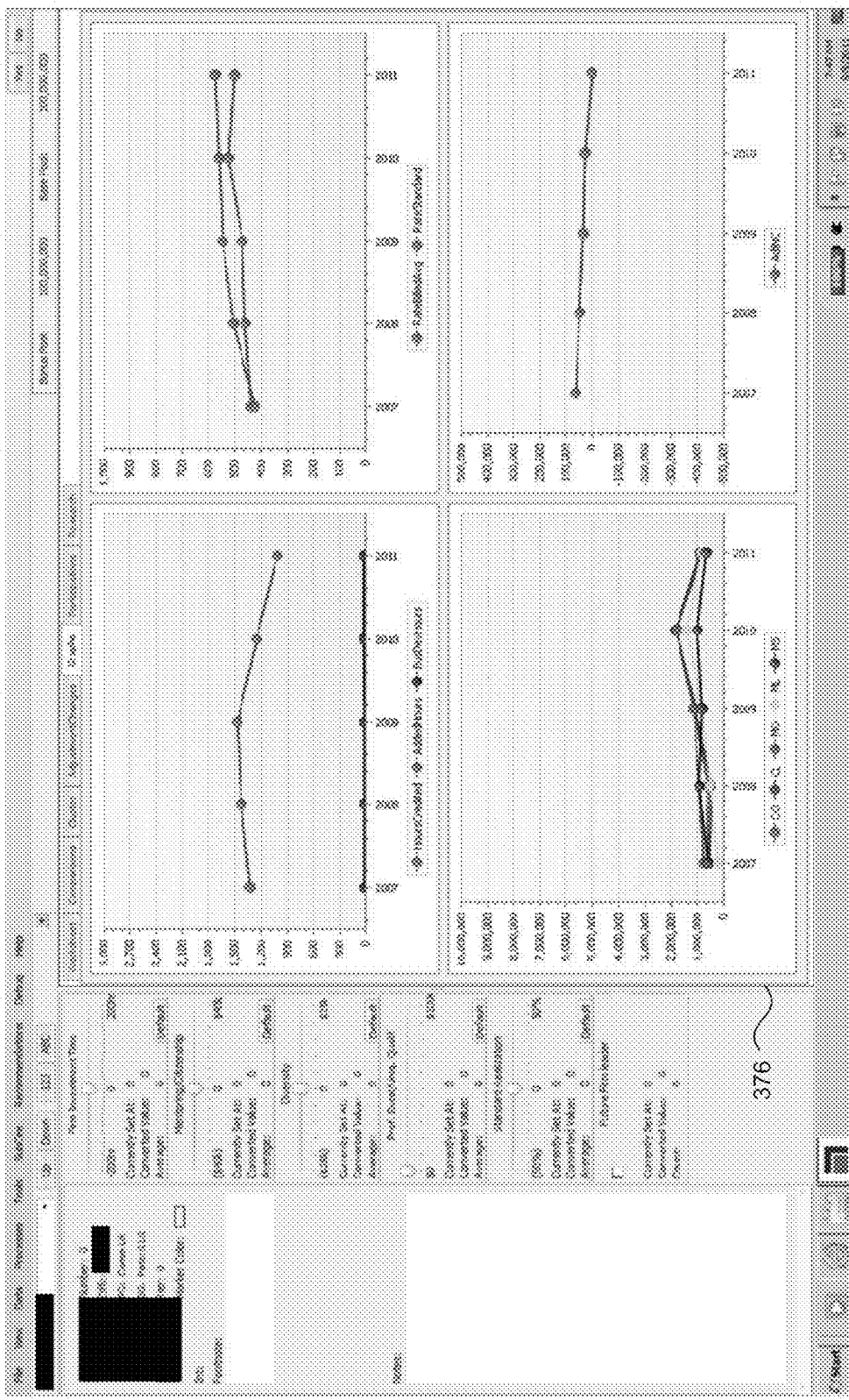

FIG. 3G illustrates a year-on-year comparisons screen, which displays graphs illustrating changes in the selected individual's statistics over a set period of time. As shown in the figure, a graph area 376 includes various graphs showing changes in ATL statistics, BTL statistics, average billing rate, and the like. Furthermore, one skilled in the art will appreciate that the graph area 376 could include graphs for any statistic tracked by the compensation system, such as personal production, base salary, bonus, etc.

Figure 3H:
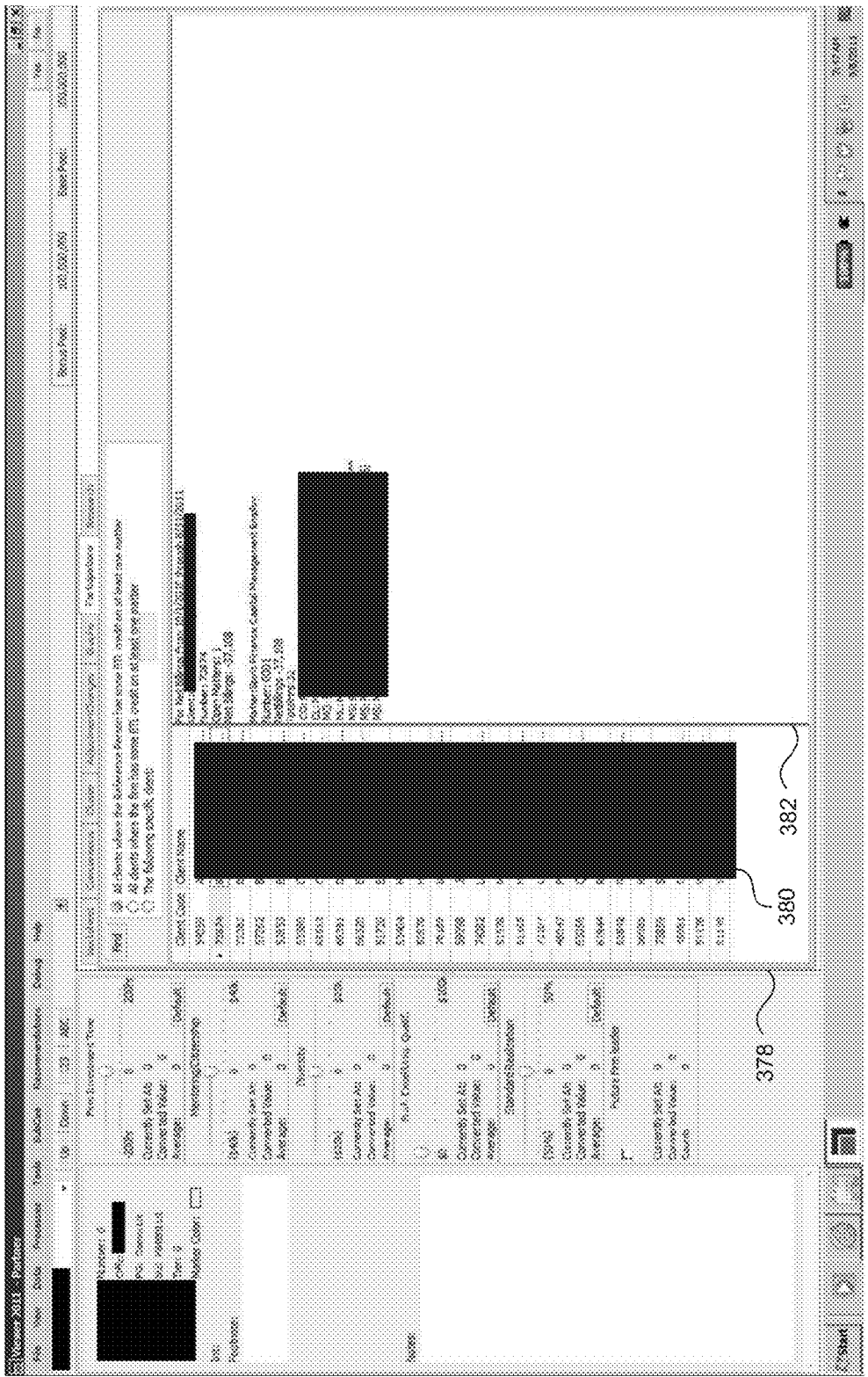
Figure 31:
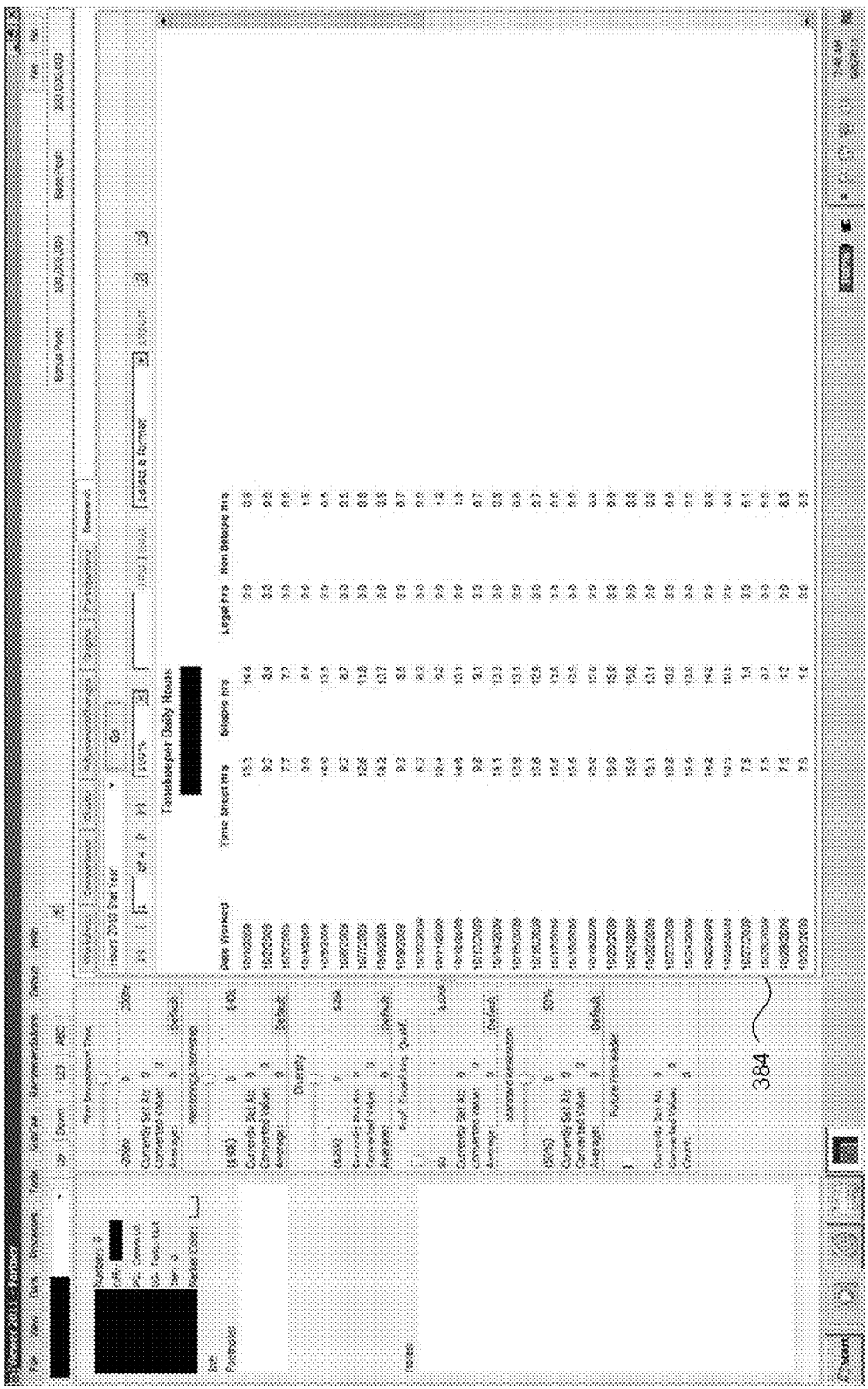

FIG. 3H is a participations screen, which lists clients associated with the selected individual. In particular, a participations area 378 contains a client listing 380, which lists some or all of the clients who were billed by the selected individual. In some implementations, the list is limited to a particular number of clients, such as the top 20 clients by billing. The listing 380 may be ordered alphabetically, based on the total amount billed to each client, or using any other ordering method. The participations area 378 also includes a details section 382 that displays the details of billing related to a selected client. For example, in FIG. 3H, the user has selected client code number 72874. Based on the selection, the system displays information in the details section

382, such as the client name, the name of the matters billed for selected client, the total billings for the selected client. The details section 382 may also provide information on who received BTL credit for that client.

FIG. 3I is a research screen of the user interface, which displays detailed billing information for the selected individual. The research screen allows the user to view low-level details of the individual's billings, such as the amount billed for each day of the fiscal year. The research screen includes a details area 384, which includes a table showing time recorded for each day in a selected year.

Figure 3J:
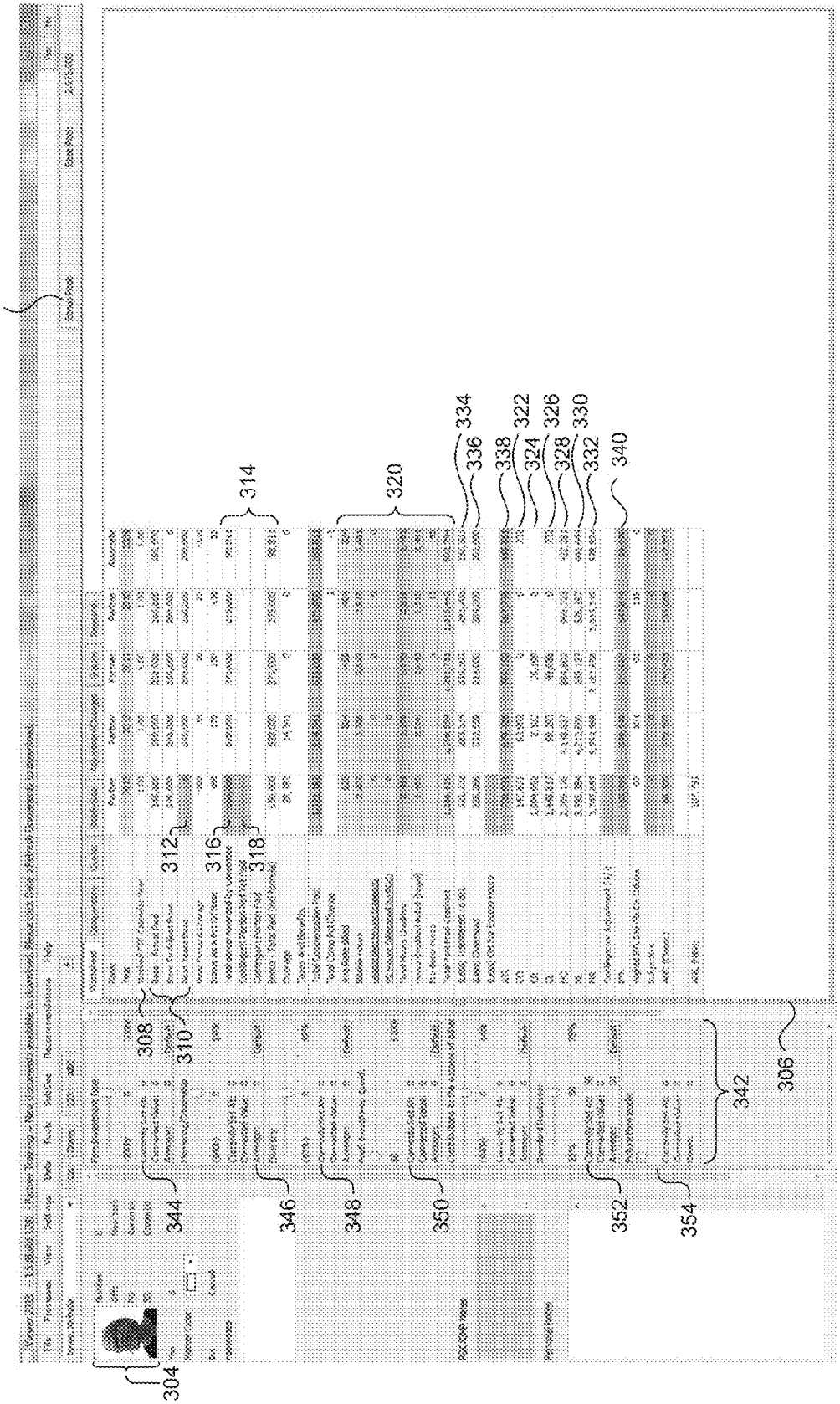
FIGS. 3J-3K illustrate aspects of an alternative user interface for interacting with the compensation system.
Figure 3K:
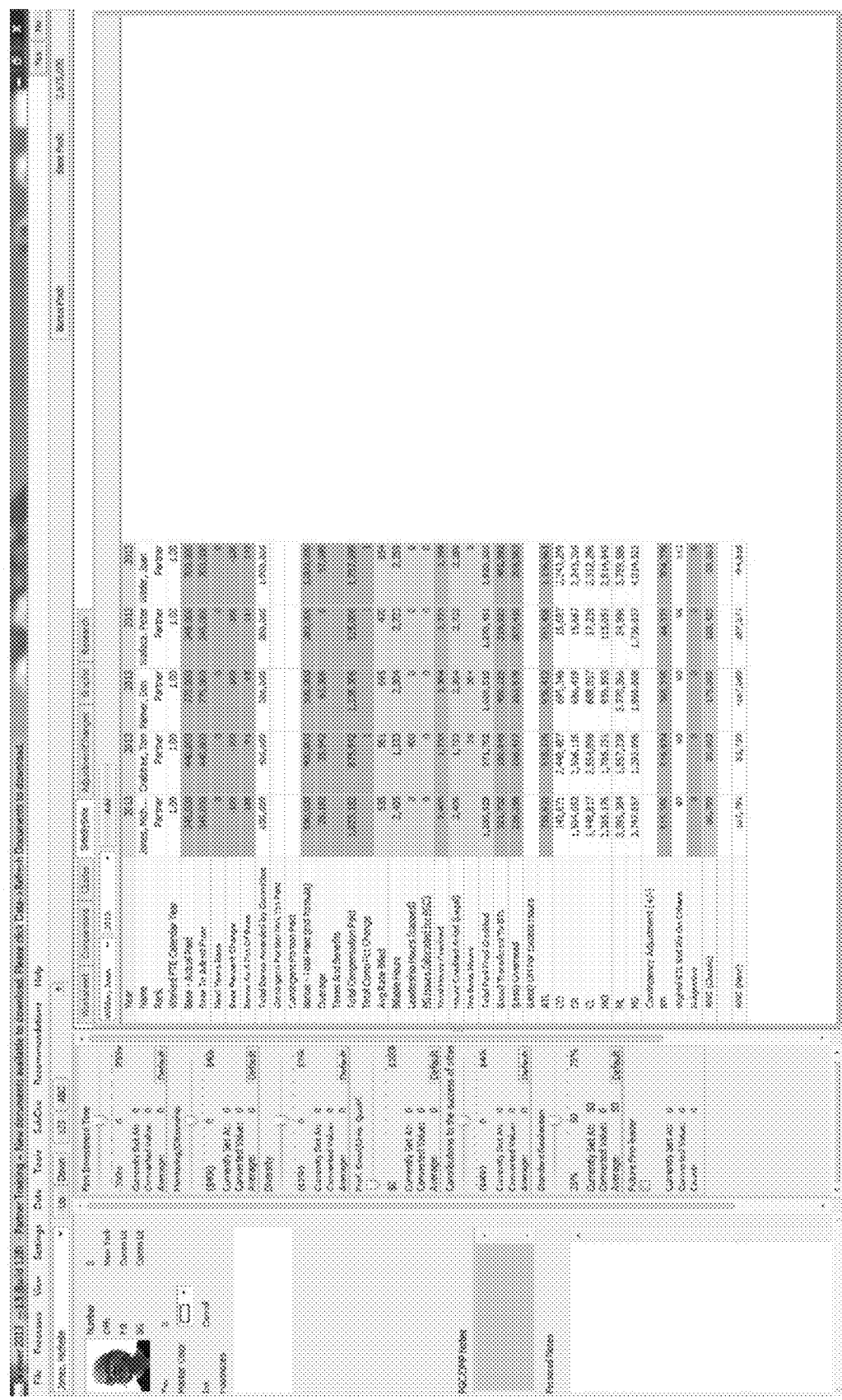

FIGS. 3J and 3K show examples of alternative user interface screens similar to that described above, where only some of the relevant differences will now be described. A practice group chair (PGC) and office managing partner (OMP) Notes section allows a PGC or OMP to provide in this section notes regarding the individual, where these notes are then provided all the users to see. In an alternative, these notes may be saved and carried forward from prior years. And, with some or all of the data provided herein, the system can recognize the user and omit any comments about that user (e.g. notes regarding the user from the PGC/OMP can be suppressed and not displayed to the user.

As shown, a "Contributions to the success of others" slider is provided which provides yet another subjective factor that the user may consider for the currently displayed individual. Of course, many other sliders may be provided to allow the user to consider other subjective factors, which the system converts to a value or monetary amount.

As shown in FIG. 3J, rows 320 different somewhat from rows 320 of FIG. 3A. For example, in FIG. 3J, a row is provided for Pro Bono Hours, Leadership Hours (e.g. hours spent by the individual in firm leadership roles such as being a PGC or OMP), and PG Hours (e.g. administrative hours allocated to an individual by a PGC for performing administrative functions). A Contingency Adjustment row allows the user to add an amount associated with any additional amount, such as contingency related statistics. The adjusted net comparator (ANC) provides two different computations, such as "Classic" and "New", both of which may simply provide different ways of comparing all individuals being analyzed. Of course, as with most statistics described herein, some rows may be combined or eliminated.

FIG. 3K shows an example of a side-by-side comparison between five individuals being considered by the user. The screen is similar to that shown in FIG. 3J, but allows a side-by-side comparison of statistics in the current year for two or more individuals. The system may allow the user to double-clicking on a value in one of the columns for an individual navigates to or displays the detail screen for that individual (such as that shown in FIG. 3J). Save and restore buttons (not shown) can allow the user to save a particular side-by-side comparison among individuals for easy retrieval and later comparison.

The user interface described above may provide a number of additional features not discussed in the figures. For example, the user interface may provide functionality to export some or all of the information to a different format, such as a spreadsheet format. This feature may allow the user to export a comma-separated variable (CSV) file or a file suitable for use in the Microsoft Excel spreadsheet program.

The user interface may also provide synchronization functionality for synchronizing locally stored data with data stored in a remote database. In some implementations, the database is implemented using standard database technology, such as Microsoft SQL Server, which is provided by Microsoft Corporation. The synchronization functionality may enable the user to download data to a mobile device (e.g. laptop or tablet), input base and bonus recommendations, upload these compensation recommendations to the remote database, and later download compensation recommendations from other committee members to the local system. The synchronization functionality may include functionality to detect changes made to local data and update remote data to only include the detected changes. In some implementations, the system stores data directly in the remote database by default. During operation, the system may detect whether it can connect to the database and store data locally if the database is unavailable. The system may then upload locally stored data to the database the next time the database is available. The user interface may also provide debugging functionality, in which the user may view raw statistical data in the form stored in the database.

The user interface may also provide functionality to view salary and bonus values input by other users of the system, such as by other members of a compensation committee. Members of the committee may then use the information to vote on a final level of compensation for each individual by determining a consensus from the values input by each committee member.

Furthermore, although the discussion above is focused on providing variable compensation to individuals who are owners or high-level managers of a particular organization, the system is not so limited. Rather, the system may be used to manage merit-based variable compensation for any group within an organization. In a law firm, this may include, for example, associates, counsel, patent agents, and paralegals.

Suitable System and Process

Figure 4:
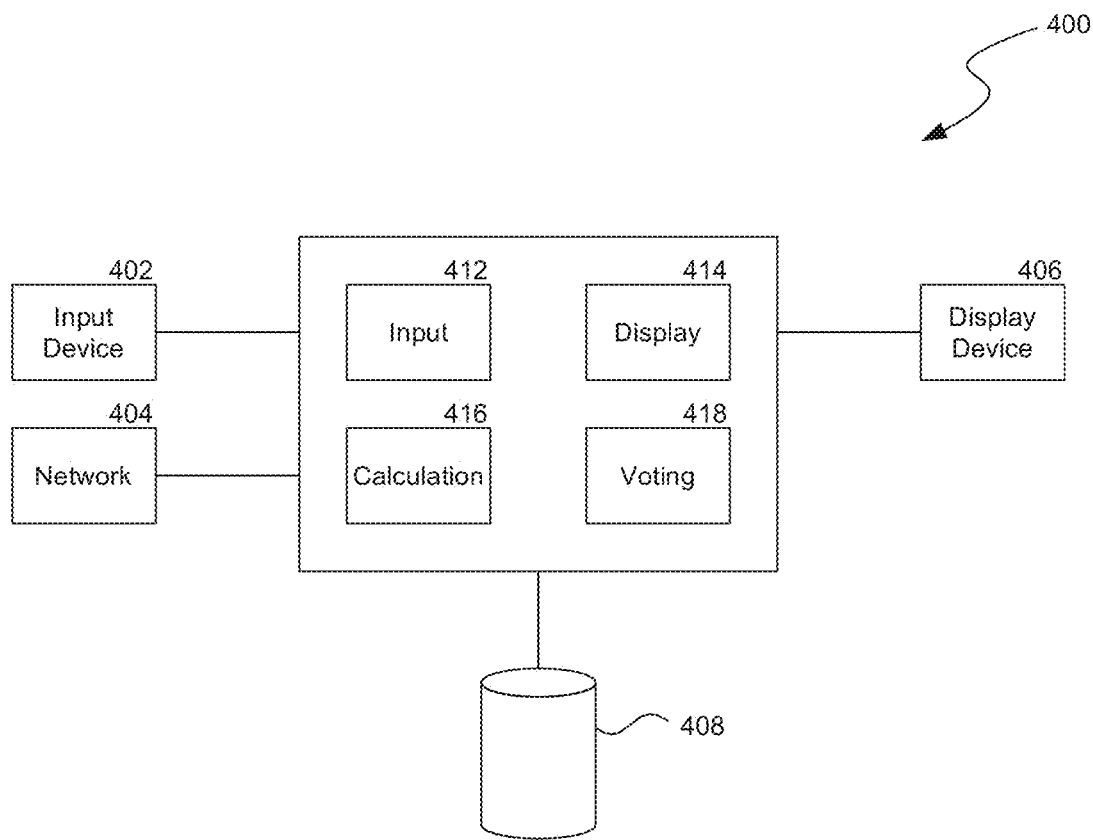
FIG. 4 is a logical block diagram of a system for providing a user interface for the compensation system.

FIG. 4 is a logical block diagram of a system 400 for providing the user interface and underlying processing described above. The components of the logical block diagram may be implemented, for example, by the device 200 of FIG. 2. Aspects of the components shown in FIG. 4 may be implemented as special-purpose hardware circuitry, programmable circuitry, or a combination of these. As will be discussed in additional detail herein, the system 400 comprises a number of modules to facilitate the functions of the compensation system. The modules and their underlying code and/or data may be implemented in a single physical device or distributed over multiple physical devices and the functionality implemented by calls to remote services. Similarly, code could be stored in local storage or remote storage and distributed in one or more physical devices. Assuming a programmable implementation, the code to support the functionality of the system may be stored on a computer-readable medium such as an optical drive, flash memory, or a hard drive. One skilled in the art will appreciate that some of these individual modules may be implemented using application-specific integrated circuits (ASICs), programmable logic devices (PLDs), or a general-purpose processor configured with software and/or firmware.

As shown in FIG. 4, the system 400 includes various external components for supporting the processing to be performed by the system 400. In particular, the system 400 includes an input device 402, which is configured to receive input from the user. The input device 402 may include any input device known in the art, such as a keyboard, mouse, touchscreen, trackball, etc. Similarly, a display device 406 displays the user interface provided by the compensation system. A network component 404 is configured to communicate with other computers, such as the central server 108. The system 400 also includes a storage component 408, which stores data for the compensation system, such as financial statistics and compensation information entered by users of the system. The storage component 408 may include local storage, storage on a server system, or a combination of both.

The system 400 includes an input component 412, which is configured to receive input to the system via a user interface, such as described above in FIG. 3. The input component 412 may also retrieve information, such as financial statistics and compensation information input by other users, from a central server 108 via the network component 404. The system 400 further includes a display component 414, which is configured to provide the user interface for display on the display device 406. During operation the display component 414 retrieves financial statistics from the storage component 408 (either locally or on a server) for display in the user interface described in FIG. 3. Typically, these financial statistics are stored in the storage component 408 at the beginning of the compensation process and are retrieved from other accounting or billing systems managed by the organization.

The system 400 includes a calculation component 416, which is configured to determine values for calculated fields in the user interface of FIGS. 3A-3I. In particular, the calculation component 416 calculates adjusted values for financial statistics based on adjustments received from the input component 412. The calculation component 416 also determines numerical values of the subjective factors as discussed above with reference to FIG. 3A.

The system 400 also includes a voting component 418, which receives and consolidates compensation input from multiple users of the compensation system. The voting component 418 causes the system to display the user interface for voting on compensation for each individual. The voting component 418 displays multiple compensation levels selected by different users of the system and enables each user to select and vote on the appropriate compensation level for the individual under consideration. Once the user has voted on compensation for the individual, the voting component 418 communicates with the server component to consolidate votes from all users. Based on the consolidated voting, the voting component 418 determines final values for base salary and bonus for the individual under consideration.

The system may also include other subcomponents as needed to assist in the execution and display of the user interface. For example, the system may include a graph component for generating comparison graphs based on the individual's or organization's financial statistics. These may include, for example, the cluster graph 352 of FIG. 3C.

Figure 5:
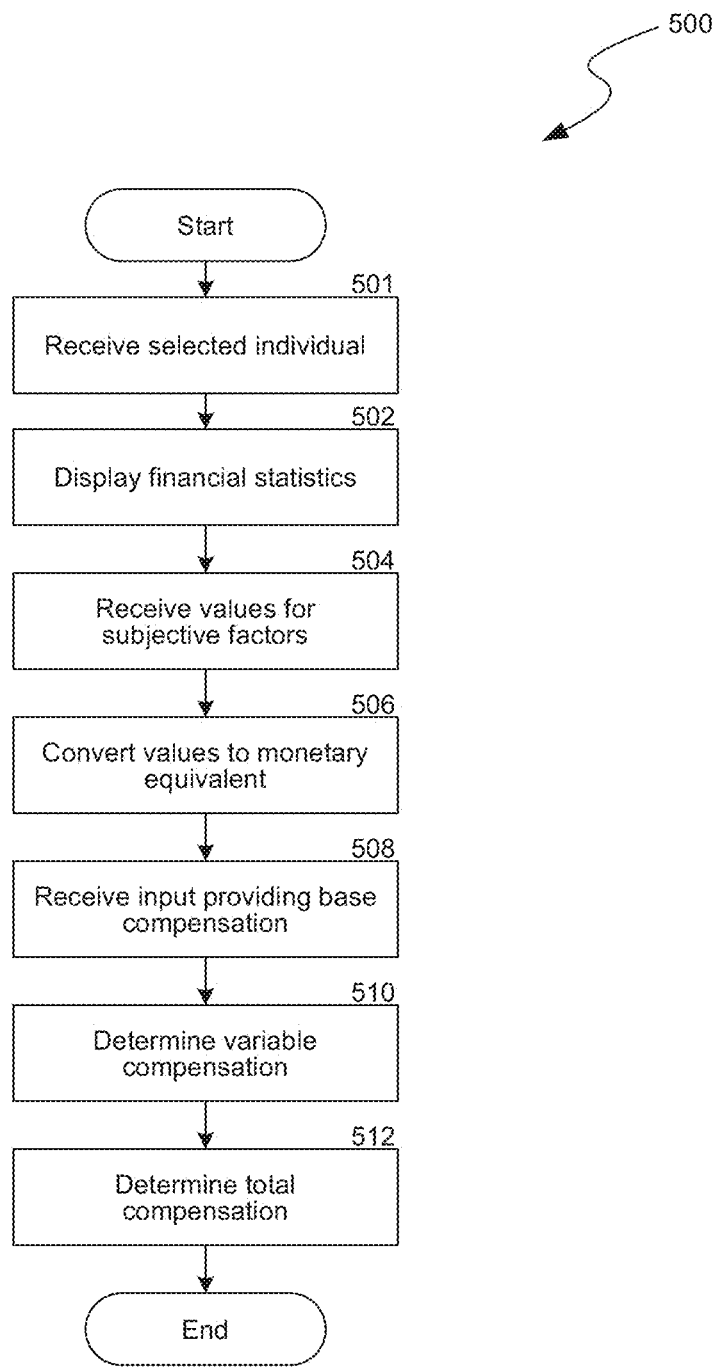
FIG. 5 is a flowchart of a process for determining compensation for a selected individual according to the compensation system.

FIG. 5 is a flowchart of an process 500 for determining compensation for a selected individual according to the compensation system. Processing begins at block 501, where the system receives input selecting an individual for consideration. The individual may be selected from a list of individuals, based on a predetermined order, randomly, or using any other method.

Processing then proceeds to block 502, where the system displays financial statistics for the selected individual. As discussed above, the financial statistics are objective statistics relating to the selected individual's performance during the year or the organization's performance as a whole, including the individual's ATL and BTL statistics (discussed above).

Processing then proceeds to block 504, where the system receives values for subjective factors associated with the selected individual. As discussed above, the subjective factors may include any non-monetary factor considered important by the organization, such as contributions to diversity, contributions to mentoring, or potential future leadership. The values for subjective factors may be entered using the sliders shown in FIG. 3A. After the system has received values for one or more of the subjective factors, processing proceeds to block 506, where the system converts the received values to a monetary equivalent. This may be done according to the methods discussed previously. In some cases, the system is preconfigured with ranges associated with each subjective factor. The value for each subjective factor may then be set based on the slider's position within the range. For example, if the slider is placed one quarter of the way from the low value to the high value, the system will allocate a monetary value corresponding to one quarter of the total range for the selected factor. If the value of a subjective factor is specified in terms of billable hours, the system automatically converts the factor to a monetary value using a predetermined hourly billing rate. The rate may be determined using the selected individual's standard billing rate, a standard rate set by the organization, or other similar methods, and the user can adjust the hourly billing rate rather than using a predetermined rate. After the monetary values of the subjective factors have been calculated, the system may also display the calculated values or the total value of subjective factors in the user interface.

Processing then proceeds to block 508, where the system receives input from the user providing base compensation for the selected individual for the following year. As discussed above, the user may determine the appropriate base compensation for the selected individual based on objective factors, such as the revenue directly generated by the individual, and subjective factors. By providing monetary values for the subjective factors, the system provides the user with an easier basis for comparing the individual's subjective performance to other individuals. In some implementations, the system determines whether the selected base compensation is within the range for the individual's salary tier. If the base compensation is outside of the range, the system may provide a warning and/or reject the input.

Processing then proceeds to block 510, where the system receives user input providing variable compensation for the selected individual. As with the base compensation, the variable compensation may be selected by the user based on objective and subjective factors described above. Processing then proceeds to block 512, where the system determines the total amount of compensation for the individual based on the selected base compensation and variable compensation.

Although the process 500 of FIG. 5 shows a particular order for the steps in calculating total compensation, many of the steps may be performed in a different order. In particular, the user interface of FIG. 3 allows the user to enter variable compensation and fixed compensation at any point during the process and does not necessarily require that they be entered in any particular order. Similarly, in some implementations, the system calculates monetary values for the subjective factors in real-time as the user modifies each factor in the user interface. Alternatively, the system may calculate monetary values only after the user has set all values in the subjective factors element 332 (FIG. 3A). In some implementations, the system may determine total compensation allocated to all individuals. The system may then provide a warning to notify users that the total compensation exceeds the pool of money available for compensation.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A method performed by a computing system for displaying information facilitating determining compensation in a variable compensation system, the computing system including at least one processor, a display device, a user input device, and at least one data storage device coupled to the at least one processor, the method comprising:

accessing financial data stored at the data storage device to retrieve a set of objective financial statistics corresponding to a selected member of an organization,
wherein at least a part of the set of objective financial statistics relates to income generated for the organization by the selected member during the previous fiscal year and includes revenue directly generated by the selected member and revenue indirectly generated by the selected member, and
wherein the selected member is one of multiple members in the organization for whom compensation is to be determined;

on the display device, displaying, in a cluster display region, a first indicator representing the selected member of the organization,
wherein the set of objective financial statistics defines a location of the first indicator in the cluster display region;

on the display device, displaying, in the cluster display region, a plurality of second indicators each representing one of a subset of the multiple members in the organization,
wherein the plurality of second indicators form a cluster centered around the first indicator and wherein the second indicators are individually actionable to receive a user interaction;

in response to receiving, via the user input device, a user interaction with a distinguished second indicator, displaying, in a detail display region on the display device, financial statistics relating to a member of the subset that is represented by the distinguished second indicator;

receiving, by the computing system and via the user input device, a selection of at least one value assigning a rating to at least one of multiple subjective factors relating to performance by the selected member of the organization and at least one of mentoring, diversity, or expected future leadership potential of the selected member;

automatically converting, by the computing system, the at least one value assigning a rating to the subjective factor to a monetary value within a predetermined range, wherein the monetary value is updated in real-time as the selection of the at least one value assigning the rating is received by the computer system;

receiving, from a user and by the user input device of the computing system, a selection of a base compensation component of the selected member's compensation that will be fixed for the next fiscal year, wherein the selection of the base compensation component is determined based at least in part on the set of objective financial statistics corresponding to the selected member;

receiving, from a user and by the user input device of the computing system, a selection of a variable compensation component of the selected member's compensation from the user, wherein the selection of the variable compensation component is determined based at least in part on the set of objective financial statistics and the converted at least one value assigning the rating to the subjective factor; and on the display device, displaying data of at least the base and the variable compensation components for the selected member of the organization.

2. The method of claim 1, the method further comprising displaying a side-by-side comparison of compensation to the selected member and at least one other member of the organization.

3. The method of claim 1, further comprising:
synchronizing compensation information with corresponding information stored in a remote storage component, wherein the synchronized compensation information includes at least one of the base compensation component or the variable compensation component; and
storing the compensation information locally when the remote storage component is not accessible and synchronizing the compensation information when the remote storage component becomes accessible.

4. The method of claim 1, wherein the revenue indirectly generated by the selected member of the organization includes credit for at least three of client origination, client retention, client management, matter origination, or matter management, and wherein the method further comprises displaying an adjusted net comparison value that takes into account, among other values, the revenue indirectly generated by the selected member of the organization and the monetary value for the assigned rating to the subjective factor.

5. The method of claim 1, further comprising restricting the selection of the base compensation to two or more discrete compensation ranges, and wherein restricting the selection of the base compensation includes providing a user-displayed modification rejecting the selected base compensation in response to determining that the selected base compensation is not within one of the two or more compensation ranges.

6. The method of claim 1, wherein the subjective factor includes at least one of mentoring, diversity, or expected future leadership potential.

7. The method of claim 1, further comprising displaying a cluster graph showing financial statistics for multiple members of the organization.

8. The method of claim 1, wherein the set of objective financial statistics is displayed in a table and wherein the selection of the base compensation is directly entered into a cell in the table.

9. The method of claim 1, further comprising recomputing and displaying updated figures associated with an available pool of compensation, wherein compensation to members of the organization is limited by the available pool of compensation, and displaying a warning when the available pool is exceeded.

10. A non-transitory computer-readable medium storing instructions for displaying information facilitating determining levels of compensation in a variable compensation system for operation in a computing system including at least one processor, a display device, a user input device, and an associated data storage device, by a method comprising:
accessing financial data stored at the data storage device to retrieve a set of objective financial statistics corresponding to a selected member of an or organization,
wherein at least a part of the set of objective financial statistics relates to income generated for the organization by the selected member during the previous fiscal year and includes revenue directly generated by the selected member and revenue indirectly generated by the selected member, and
wherein the selected member is one of multiple members in the organization for whom compensation is to be determined;
on the display device, displaying, in a first display region, a first indicator representing the selected member of the organization,
wherein the set of objective financial statistics defines a location of the first indicator in the first display region;
on the display device, displaying, in the first display region, a plurality of second indicators each representing one of a subset of the multiple members in the organization,
wherein the plurality of second indicators form a cluster centered around the first indicator and wherein the second indicators are individually actionable to receive a user interaction;
in response to receiving a user interaction with a distinguished second indicator, displaying, in a second display region on the display device, financial statistics relating to a member of the subset that is represented by the distinguished second indicator;
receiving, by the computing system and via the user input device, a selection of at least one value assigning a rating to a subjective factor relating to performance by the selected member of the organization and at least one of mentoring, diversity, or expected future leadership potential of the selected member;
automatically converting, by the computing system, the at least one value assigning a rating to the subjective factor to a monetary value within a predetermined range;
receiving, from a user and by the input device of the computing system, a selection of a base compensation component of the selected member's compensation that will be fixed for the next fiscal year,
wherein the selection of the base compensation component is determined based at least in part on the objective financial statistics corresponding to the selected member;

receiving, from a user and by the input device of the computing system, a selection of a variable compensation component of the selected member's compensation from the user,
  wherein the selection of the variable compensation component is determined based at least in part on the objective financial statistics and the converted at least one value assigning the rating to the subjective factor; and
on the display device, displaying data corresponding to at least the base and the variable compensation components for the selected member of the organization.

11. The computer-readable medium of claim 10, the method further comprising synchronizing compensation information with corresponding information stored in a remote storage component, such that the synchronized compensation information can be viewed by others in real time, wherein the synchronized compensation information includes at least one of the base compensation or the converted monetary value.

12. The computer-readable medium of claim 10, wherein the revenue indirectly generated by the selected member of the organization includes a weighted credit for at least two of client business origination, client management, matter origination, or matter management.

13. The computer-readable medium of claim 10, the method further comprising:
  receiving an adjustment to an indirect contribution portion of the set of objective financial statistics and automatically adjusting the base compensation based on the adjusted indirect contribution portion of the set of objective financial statistics; and
  receiving a second compensation level for the selected member of the organization and determining a final compensation for the selected member of the organization based on the determined compensation level and the second compensation level.

14. A computing system for determining compensation in a variable compensation system, the system comprising:
  at least one processor;
  at least one display device;
  at least one user input device; and
  at least one data storage device coupled to the at least one processor,
  wherein the at least one processor is configured to perform operations to assist in determining compensation for a selected member of an organization in a variable compensation system, including:
    accessing financial data stored at the data storage device to retrieve a set of objective financial statistics corresponding to a selected member of an organization,
      wherein at least a part of the set of objective financial statistics relates to income generated for the organization that has been attributed to the selected member, and
      wherein the selected member is one of multiple members in the organization for whom compensation is to be determined;
    causing display, in a first display region on the at least one display device, a first indicator representing the selected member of the organization,
      wherein the set of objective financial statistics defines a location of the first indicator in the first display region;
    causing display, in the first display region on the at least one display device, a plurality of second indicators each representing one of a subset of the multiple members in the organization,
      wherein the plurality of second indicators form a cluster centered around the first indicator and wherein the second indicators are individually actionable to receive a user interaction;
    in response to receiving a user interaction with a distinguished second indicator, causing display, in a second display region on the at least one display device, financial statistics relating to a member of the subset that is represented by the distinguished second indicator;
    receiving, by the computing system and via the at least one user input device, a selection of at least one value assigning a rating to a subjective factor relating to performance by the selected member of the organization and at least one of mentoring, diversity, or expected future leadership potential of the selected member;
    automatically converting, by the computing system, the at least one value assigning a rating to the subjective factor to a monetary value within a predetermined range;
    automatically applying, by the computing system, a weighting to different categories within the set of objective financial statistics to generate a weighted set of objective statistics;
    receiving, from a user and by the at least one user input device of the computing system, a selection of a base compensation component of the selected member's compensation that will be fixed for the next fiscal year,
      wherein the selection of the base compensation component is determined based at least in part on the set of objective financial statistics about the selected member;
    receiving, from a user and by the at least one user device of the computing system, a selection of a variable compensation component of the selected member's compensation from the user,
      wherein the selection of the variable compensation component is determined based at least in part on the set of objective financial statistics, the weighted set of objective statistics, and the converted at least one value assigning the rating to the subjective factor; and
    causing display, on the at least one display device, of data corresponding to at least the base and the variable compensation components for the selected member of the organization.

15. The system of claim 14, the method further comprising displaying a side-by-side comparison of compensation to the selected member and at least one other member of the organization.

16. The system of claim 14, further comprising:
  synchronizing compensation information with corresponding information stored in a remote storage component, wherein the synchronized compensation information includes at least one of the base compensation component or the variable compensation component; and
  storing the compensation information locally when the remote storage component is not accessible and synchronizing the compensation information when the remote storage component becomes accessible.

17. The system of claim 14, wherein the set of objective financial statistics includes revenue directly generated by the selected member of the organization and revenue indirectly generated by the selected member of the organization; wherein the revenue indirectly generated by the selected member of the organization includes credit for at least three of client origination, client retention, client management, matter origination, or matter management, and wherein the method further comprises displaying an adjusted net comparison value that takes into account, among other values, the revenue indirectly generated by the selected member of the organization and the monetary value for the assigned rating to the subjective factor.

18. The system of claim 14, further comprising restricting the selection of the base compensation to two or more discrete compensation ranges, and wherein restricting the selection of the base compensation includes providing a user-displayed modification rejecting the selected base compensation in response to determining that the selected base compensation is not within one of the two or more compensation ranges.

19. The system of claim 14, wherein the set of objective financial statistics is displayed in a table and wherein the selection of the base compensation is directly entered into a cell in the table.

20. The system of claim 14, further comprising recomputing and displaying updated figures associated with an available pool of compensation, wherein compensation to members of the organization is limited by the available pool of compensation, and automatically displaying a warning when the available pool is exceeded.

* * * * *